US008370960B2

(12) United States Patent
Proksch et al.

(10) Patent No.: US 8,370,960 B2
(45) Date of Patent: Feb. 5, 2013

(54) MODULAR ATOMIC FORCE MICROSCOPE

(75) Inventors: Roger Proksch, Santa Barbara, CA (US); Mario Viani, Santa Barbara, CA (US); Jason Cleveland, Ventura, CA (US); Maarten Rutgers, Los Angeles, CA (US); Matthew Klonowski, Santa Barbara, CA (US); Daren Walters, Goleta, CA (US); James Hodgson, Santa Barbara, CA (US); Jonathan Hensel, Santa Barbara, CA (US); Paul Costales, Santa Barbara, CA (US); Anil Gannepalli, Goleta, CA (US)

(73) Assignee: Asylum Research Corporation, Goleta, CA (US)

(*) Notice: Subject to any disclaimer, the term of this patent is extended or adjusted under 35 U.S.C. 154(b) by 17 days.

(21) Appl. No.: 12/587,943

(22) Filed: Oct. 14, 2009

(65) Prior Publication Data
US 2010/0275334 A1    Oct. 28, 2010

Related U.S. Application Data

(60) Provisional application No. 61/195,994, filed on Oct. 14, 2008.

(51) Int. Cl.
*G01Q 30/10* (2010.01)
*G01Q 30/08* (2010.01)
*G01Q 60/38* (2010.01)

(52) U.S. Cl. ............... 850/13; 850/17; 850/40

(58) Field of Classification Search ............ 850/12–13, 850/16–17, 33
See application file for complete search history.

(56) References Cited

U.S. PATENT DOCUMENTS

| 5,760,396 | A | * | 6/1998 | Lindsay et al. | 850/1 |
| 6,748,794 | B2 | * | 6/2004 | Ray | 73/105 |
| 2001/0054691 | A1 | * | 12/2001 | Park et al. | 250/309 |
| 2003/0015653 | A1 | * | 1/2003 | Hansma et al. | 250/234 |
| 2004/0089059 | A1 | * | 5/2004 | Watanabe et al. | 73/105 |
| 2007/0157712 | A1 | * | 7/2007 | Amakusa | 73/105 |
| 2007/0195333 | A1 | * | 8/2007 | Negishi | 356/601 |
| 2008/0130304 | A1 | * | 6/2008 | Rash et al. | 362/477 |

* cited by examiner

*Primary Examiner* — Robert Kim
*Assistant Examiner* — David E Smith
(74) *Attorney, Agent, or Firm* — Law Office of Scott C. Harris, Inc.

(57) ABSTRACT

A modular AFM/SPM which provides faster measurements, in part through the use of smaller probes, of smaller forces and movements, free of noise artifacts, that the old generations of these devices have increasingly been unable to provide. The modular AFM/SPM includes a chassis, the foundation on which the modules of the instrument are supported; a view module providing the optics for viewing the sample and the probe; a head module providing the components for the optical lever arrangement and for steering and focusing those components; a scanner module providing the XYZ translation stage that actuates the sample in those dimensions and the engage mechanism; a isolation module that encloses the chassis and provides acoustic and/or thermal isolation for the instrument and an electronics module which, together with the separate controller, provide the electronics for acquiring and processing images and controlling the other functions of the instrument. All these modules and many of their subassemblies are replaceable and potentially upgradeable. This allows updating to new technology as it becomes available.

3 Claims, 10 Drawing Sheets

MODULAR ATOMIC FORCE MICROSCOPE

REFERENCES CITED

U.S. Patent Documents

U.S. Pat. No. 5,825,020 10/1998 Hansma, et al.
U.S. Pat. No. 6,871,527 3/2005 Hansma, et al.

OTHER PUBLICATIONS

Eur Pat App 90107769 4/1989 Okada, et al.

BACKGROUND OF THE INVENTION

Scanning probe devices such as the atomic force microscope (AFM) can be used to obtain an image or other information indicative of the features of a wide range of materials with molecular and even atomic level resolution. In addition, AFMs are capable of measuring forces accurately at the piconewton to micronewton range, in a measurement mode known as a force-distance curve or force curve. As the demand for resolution has increased, requiring the measurement of decreasingly smaller forces and movements free of noise artifacts, the old generations of these devices are made obsolete. A demand for faster results, requiring decreasingly smaller cantilevers, only reinforces this obsolescence. The preferable approach is a new device that addresses the central issue of measuring small forces and movements with minimal noise, while providing an array of modules optimizing the performance of the device when using small cantilevers or when doing specialized applications such as electrical techniques, optical techniques for biology and energy research, nanoindentation and electrochemistry.

For the sake of convenience, the current description focuses on systems and techniques that may be realized in a particular embodiment of scanning probe devices, the atomic force microscope (AFM). Scanning probe devices include such instruments as AFMs, 3D molecular force probe instruments, scanning tunneling microscopes (STMs), high-resolution profilometers (including mechanical stylus profilometers), surface modification instruments, nanoindenters, chemical/biological sensing probes, instruments for electrical measurements and micro-actuated devices. The systems and techniques described herein may be realized in such other scanning probe devices.

An AFM is a device which obtains topographical information (and/or other sample characteristics) while scanning (e.g., rastering) a sharp tip on the end of a probe relative to the surface of the sample. The information and characteristics are obtained by detecting changes in the deflection or oscillation of the probe (by detecting small changes in amplitude, deflection, phase, frequency, etc.) and using feedback to return the system to a reference state. By scanning the tip relative to the sample, a "map" of the sample topography or other characteristics may be obtained.

Changes in the deflection or oscillation of the probe are typically detected by an optical lever arrangement whereby a light beam is directed onto the side of the probe opposite the tip. The beam reflected from the probe illuminates a position sensitive detector (PSD). As the deflection or oscillation of the probe changes, the position of the reflected spot on the PSD also changes, causing a change in the output from the PSD. Changes in the deflection or oscillation of the probe are typically made to trigger a change in the vertical position of the base of the probe relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact modes where the tip of the probe is in constant contact with the sample surface, and AC modes where the tip makes no contact or only intermittent contact with the surface.

Actuators are commonly used in AFMs, for example to raster the probe over the sample surface or to change the position of the base of the probe relative to the sample surface. The purpose of actuators is to provide relative movement between different parts of the AFM; for example, between the probe and the sample. For different purposes and different results, it may be useful to actuate the sample or the probe or some combination of both. Sensors are also commonly used in AFMs. They are used to detect movement, position, or other attributes of various components of the AFM, including movement created by actuators.

For the purposes of this specification, unless otherwise indicated (i) the term "actuator" refers to a broad array of devices that convert input signals into physical motion, including piezo activated flexures; piezo tubes; piezo stacks, blocks, bimorphs and unimorphs; linear motors; electrostrictive actuators; electrostatic motors; capacitive motors; voice coil actuators; and magnetostrictive actuators; and (ii) the term "sensor" or "position sensor" refers to a device that converts a physical quantity such as displacement, velocity or acceleration into one or more signals such as an electrical signal, and vice versa, including optical deflection detectors (including those referred to above as a PSD and those described in co-pending applications US Patent App. Pub. Nos. US20030209060 and US20040079142, Apparatus and Method for Isolating and Measuring Movement in Metrology Apparatus, which are hereby incorporated by reference in their entirety), capacitive sensors, inductive sensors (including eddy current sensors), differential transformers (such as described in U.S. Pat. No. 7,038,443 and co-pending applications US Patent App. Pub. Nos. US20020175677, Linear Variable Differential Transformers for High Precision Position Measurements, and US20040056653, Linear Variable Differential Transformer with Digital Electronics, which are hereby incorporated by reference in their entirety), variable reluctance, optical interferometry, strain gages, piezo sensors and magnetostrictive and electrostrictive sensors.

Some current AFMs can take images up to $100\ \mu m^2$, but are typically used in the $1\ \mu m^2$-$10\ \mu m^2$ regime. Such images typically require from four to ten minutes to acquire. Efforts are currently being made to move toward what is sometimes called "video rate" imaging. Typically those who use this term include producing images at the rate of one frame per second all the way to true video rate at the rate of 30 frames per second. Video rate imaging would enable imaging moving samples, imaging more ephemeral events and simply completing imaging on a more timely basis. One important means for moving toward video rate imaging is to decrease the mass of the probe, thereby achieving a higher resonant frequency with an equal or lower spring constant.

Conventional AFM probes are currently 50-450 μm in length with fundamental resonant frequencies ($f_R$) of 10-500 kHz and spring constants of 0.01-200 N/m. Physical laws put lower limits on the achievable resolution and scan speed of conventional probes, given typical acceptable noise levels.

To get the best resolution measurements, one wants the tip of the probe to exert only a low force on the sample. In biology, for example, one often deals with samples that are so soft that forces above 10 pN can modify or damage the sample. This also holds true for high resolution measurements on hard samples such as inorganic crystals, since higher forces have the effect of pushing the tip into the sample, increasing the interaction area and thus lowering the resolution. For a given deflection of the probe, the force increases with the spring constant (k) of the probe. When operating in air in AC modes where the tip makes only intermittent contact with the sample surface, spring constants below 30 N/m are desirable. For general operation in fluid, very small spring constants (less than about 1.0 N/m) are desirable.

To get measurements with higher scan speeds, one wants probes with a high $f_R$. After passing over a sample feature, the probe response is about $1/f_R$ seconds for contact modes and $Q/f_R$ seconds for AC modes (where Q is the quality factor for the probe). This sets a fundamental limit on scanning speed: lowering the response time of the probe requires a probe with a high $f_R$ or, in the case of AC modes, either a low Q or a high $f_R$ or both.

A higher $f_R$ also means lower noise operation. The thermal noise of a probe involves fixed noise energy of order kT (where k is the Boltzmann constant and T is the temperature in Kelvin) spread over a frequency range up to approximately $f_R$. Thus, the higher $f_R$, the lower the noise per unit band width below $f_R$.

Probes with a high resonant frequency and a low spring constant can be achieved by making them smaller and thinner. However, using current AFMs with probes significantly smaller than conventional ones presents difficulties. In general, optimal optical lever detection requires that the spot from the light beam directed onto the side of the probe opposite the tip should substantially fill the area along the length of the probe. Underfilling results in a loss of optical lever detection efficiency because the reflected beam diverges more than necessary. Overfilling the probe means losing light and producing unwanted interference fringes due to light reflected off the sample.

One ideal probe for video rate imaging would have a $f_R$ in the 5-10 MHz range and a force constant in the 1-40 N/m range. This implies shrinking conventional probes by an order of magnitude, to approximately 5-8 μm in length or width. Such a shrinking, taken together with the requirement that the spot substantially fill the probe, means that the spot on the probe also must be shrunk. The optical system producing the beam incident on the probe should have a numerical aperture (NA) sufficient with the wavelength of the light from the light source to form a focused spot approximately 5-8 μm in diameter in at least one direction.

The relatively large numerical aperture required to so shrink the spot results in a shallow depth of focus. This can present problems with the refocusing necessary when replacing one probe with another or when using a probe with more than one cantilever. In addition, the large opening angle of the incident beam used to achieve a high numerical aperture can require complex lens systems or an accumulation of lenses in close proximity to the probe.

SUMMARY OF THE INVENTION

DESCRIPTION OF THE PREFERRED EMBODIMENTS

Figure 1:
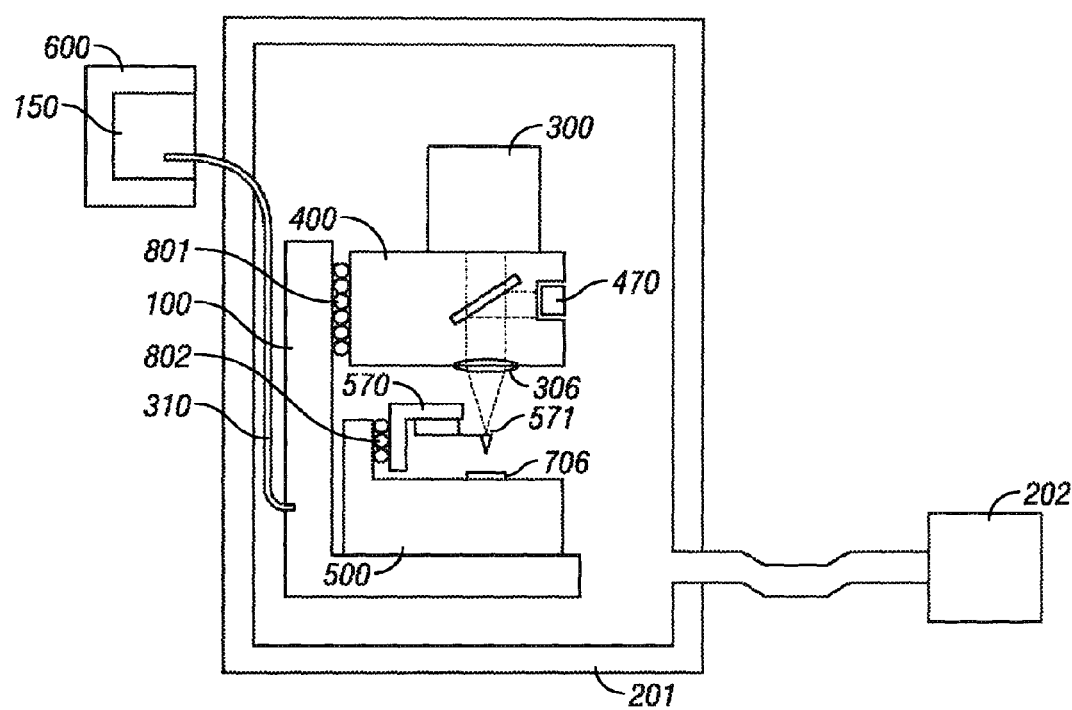
FIG. 1: Block diagram of the modular AFM of the present invention.

FIG. 1 shows an overall block diagram of an embodiment of the present invention, a modular AFM. The block diagram shows different subassemblies that each carry out different functions. The Chassis 100 is the foundation on which the modules of the modular AFM are supported. The View module 300 provides the optics for viewing the sample and the probe. The Head module 400 includes the components for the optical lever arrangement and for steering and focusing those components. The Scanner module 500 includes the XYZ translation stage that actuates the sample in those dimensions and the engage mechanism. The Isolation module 200 encloses the Chassis 100 and provides acoustic and/or thermal isolation for the modular AFM. The Electronics module 600, together with the controller for the modular AFM, provide the electronics for acquiring and processing images and controlling the other functions of the modular AFM. The Electronics module 600 is mounted adjacent the other modules of the Chassis 100, but outside the Isolation module 200. All these subassemblies are replaceable and potentially upgradeable. This allows updating to new technology as it becomes available.

The foregoing modules include certain submodules that are replaceable and potentially upgradeable. Two of these submodules are of particular importance, as will be elaborated upon later. The first is the Light Source submodule 470 which is attached to the Head module 400 with a kinematic mount or other interface. The Light Source submodule 470 is easily removed and replaced which facilitates replacement of the optical source and lens which are part of the optical lever arrangement. The second is the Cantilever Holder submodule 570 which is attached to the Scanner module 500 with one-axis cross-roller bearings or another linear motion stage, and is part of the engage mechanism.

Isolation Module

The Chassis 100 is contained within the Isolation module 200 which provides acoustic and/or thermal isolation for the subassemblies of the modular AFM. Acoustic noise from the environment surrounding the AFM causes movement in the components of the AFM and degrades the images produced by the instrument. Temperature variations similarly cause movement in the components of the AFM. Temperature variations can cause as much as a nanometer of movement in the components for every 2° C., of temperature change.

Figure 2:
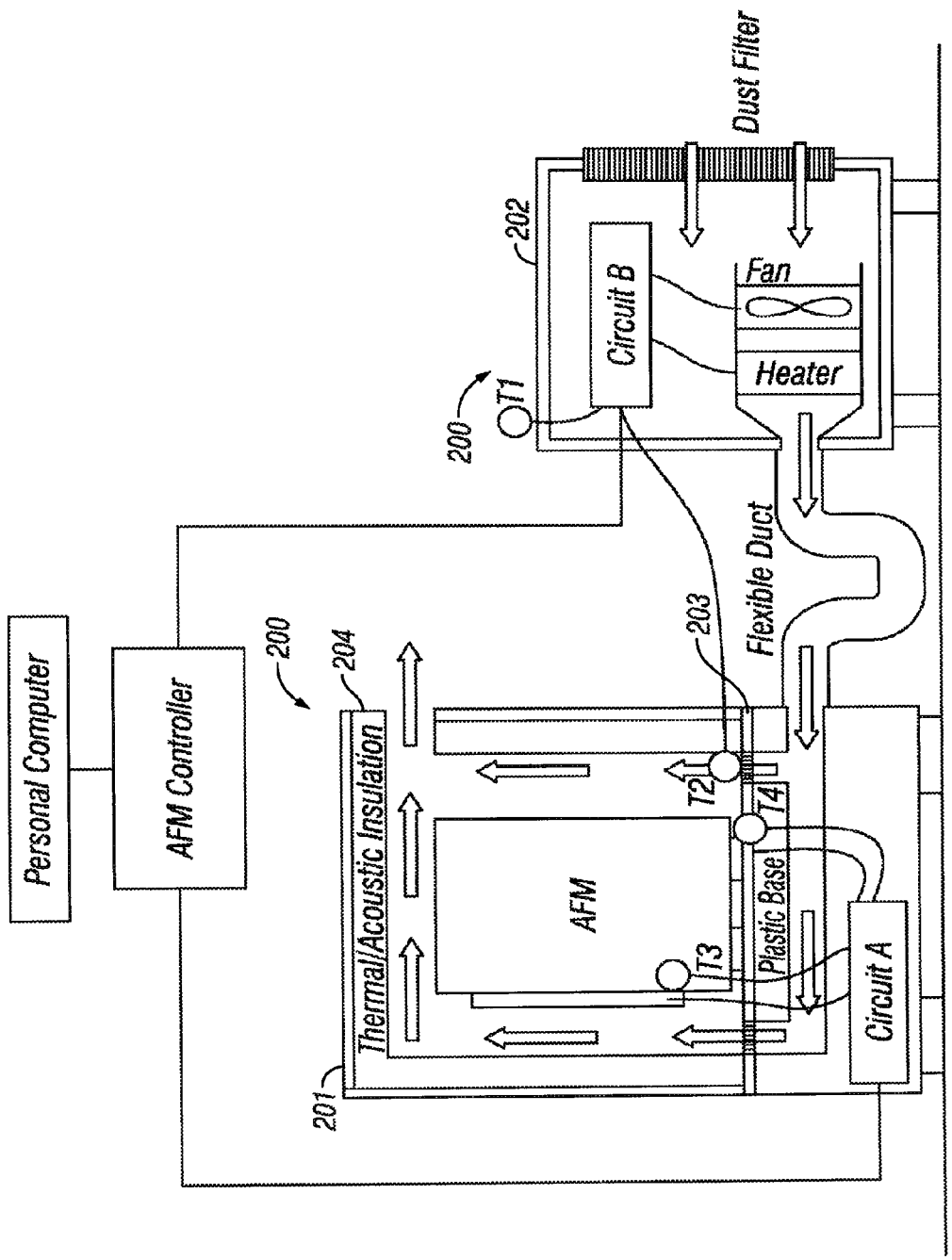
FIG. 2: Thermal and acoustic isolation chamber.

As depicted in FIG. 2, the Isolation module 200 includes an enclosure 201 of the modular AFM and a separate heater 202 connected to the enclosure with a flexible duct. The enclosure 201 may have doors (not shown) that can be completely closed to dampen acoustic noise. The enclosure 201 together with the heater 202 is intended to create a local environment around the modular AFM above the temperature of the room in which the Isolation module 200 is located and with reduced temperature variations compared to the room. The isolation could also be used to create a local environment around the modular AFM below the temperature of the room, again with reduced temperature variations compared to the room, but this would be a more expensive alternative.

The thermal isolation achieved with the enclosure 201 is measured by comparing the relative change in the room temperature at T1 of FIG. 2 with the relative change in the enclosure temperature at T2. For this purpose, the ratio of room temperature variations to enclosure temperature variations may be used as a measure of success. For instance, if the room temperature falls by 2 degrees over the course of the night, and the enclosure temperature falls by 0.2 degrees during the same time period, the level of thermal isolation may be referred to as a factor of 10.

Without using any active temperature control, the enclosure 201 will passively eliminate temperature variations such as changes occurring over a few minutes. Variations such as changes of degrees per hour however will inevitably penetrate the enclosure and the modular AFM inside. The level of passive isolation can be maximized by surrounding the Chassis 100 with as thick a layer of thermally insulating material 204 as possible. This is relatively easy on the sides and top of the enclosure but is a problem at the bottom, which must support the heavy instrument. Accordingly, some form of active temperature control is useful to improve the situation, just as even the best insulated houses in cold climates will still require some sort of controlled heating system.

The controlled heating system of the modular AFM of the present invention includes two simultaneous sources of heat. One is a heated metal plate 203 on which the Chassis 100 is placed. The temperature of the plate is measured at T4. A digital PID controller, identified as Circuit A in FIG. 2, performs the closed loop feedback control. The metal plate 203 is the largest thermal link to the outside room. Just controlling its temperature will achieve a level of thermal isolation at a factor of approximately 5. The second source of heat is to provide a laminar flow of heated air into the inside of the enclosure 201. The flow is produced by the separate heater 202 connected to the enclosure 201 with a flexible duct of conventional design. The temperature of the flow is measured inside the enclosure 201 at T2. A digital PID controller, identified as Circuit B in FIG. 2, performs the closed loop feedback control. The laminar flow preferably is slow enough to avoid any kind of shaking or other vibration. However for imaging at the atomic level it is desirable to introduce a draft shield (not shown) around the imaging area. This draft shield protects the probe and sample from air currents inside the enclosure, in a manner similar to the inner draft shield of a conventional analytical balance.

When heating the metal plate 203 is combined with the use of the separate heater 202, with the temperature to be maintained the same for both, and a level of thermal isolation at a factor of 25 is achieved.

The results of using two simultaneous sources of heating may be enhanced by improved by heating the metal parts, for example the Scanner module 500, or the Chassis 100, directly. The temperature of the Scanner module 500, for this purpose, would be measured at T3 and the digital PID controller, Circuit A in FIG. 2, would perform the closed loop feedback control.

A door (not shown) in the enclosure 201 must be opened to change the AFM sample 706 or probe 571. This introduces a large, sudden change in the temperature of the enclosure and also changes the airflow in the enclosure. Preferably the door is provided with a sensor (not shown) to detect when the door is opened and when it is closed. This permits the feedback loop to compensate for the changes in temperature and airflow. For example, the fan forming part of the heater 202 may be increased to a higher flow rate and/or the heater may be set to a higher power. Optionally the feedback may be switched off temporarily while the door is open, and the heater 202 run at constant power, to maximize the stability of the AFM temperature. These changes in the feedback loop may be done directly via Circuit A and Circuit B, or indirectly via commands from the AFM controller.

View Module

Figure 4A:
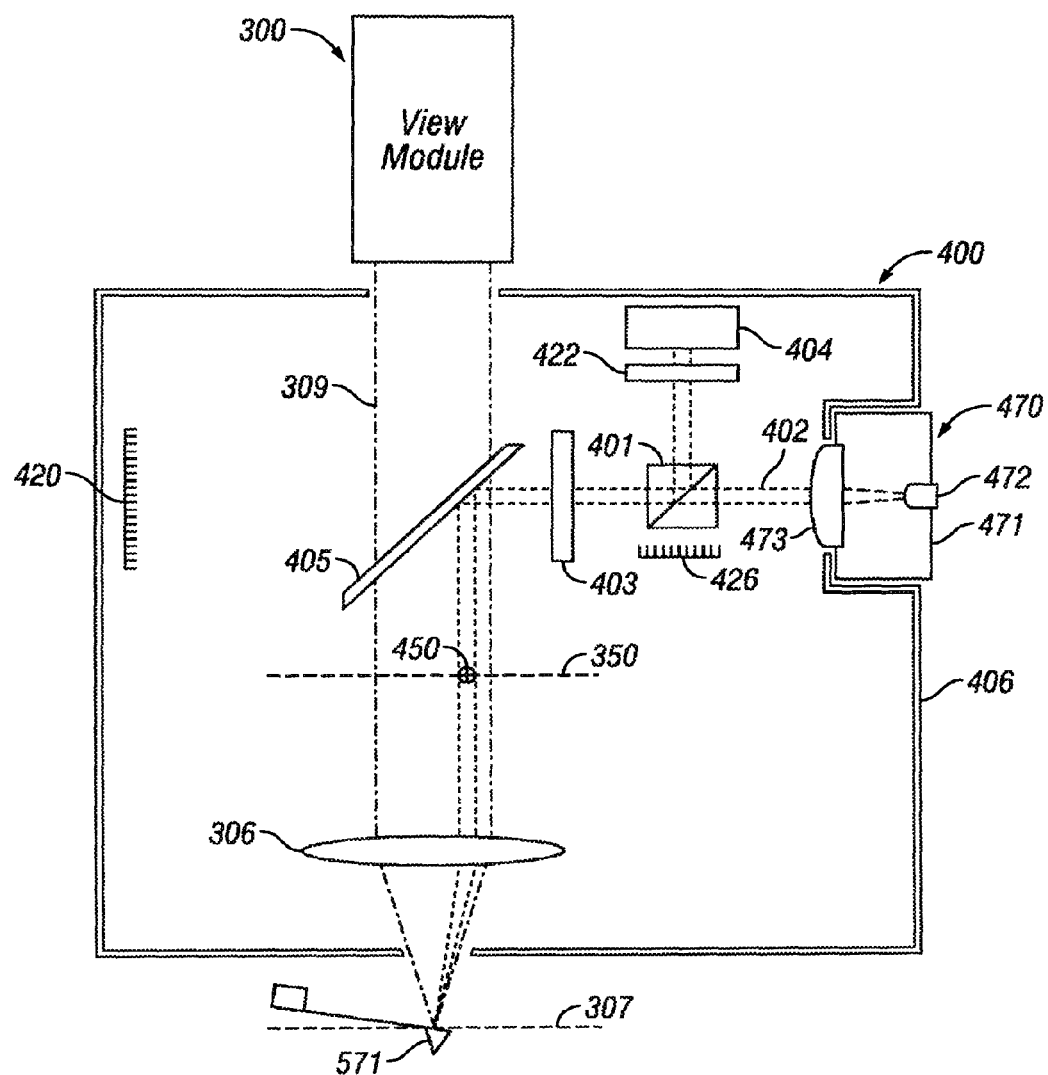
FIG. 4A: A schematic of the optics

The modular AFM of the present invention combines a viewing arrangement, giving the user a high resolution view of the probe and the sample, and the optical lever arrangement, providing the detection integral to an AFM. As shown in FIG. 4A, both the viewing arrangement and the optical lever arrangement employ the same objective lens 306 which is mounted in the Head Module 400. For the optical lever arrangement, the objective lens 306 serves to direct and focus the optical lever beam 402 on the side of the probe 571 opposite the tip. For the viewing arrangement, the objective lens 306 acts in conjunction with additional lenses to form an image of the probe 571 and/or the sample (not shown) on an image sensor 340.

Optimally the objective lens 306 is an infinity-corrected lens, that is, a lens designed to produce a parallel beam of light from an object at its front focal plane 307. One example of such a lens is the LUCPLFLN 20x/0.45NA objective lens manufactured by Olympus Optical Corporation. With such a lens, the dichroic short pass mirror 405 does not introduce significant aberration into the transmitted viewing beam 309.

When the objective lens 306 is an infinity-corrected lens, the View module 300 is designed to receive, from each point on the front focal plane 307, a bundle of parallel rays and focus them to a point on the image sensor 340 with a minimum of aberration. For some purposes however the objective lens 306 could be a finite-focus lens. One example of such a lens is the CF M Plan LWD 20x/0.40NA objective from Nikon Corp. With such a lens, the View module 300 is designed to receive converging rays and focus them to a point on the image sensor 340 with minimal aberration, including compensation for aberration caused by the dichroic short pass mirror 405.

Figure 3:
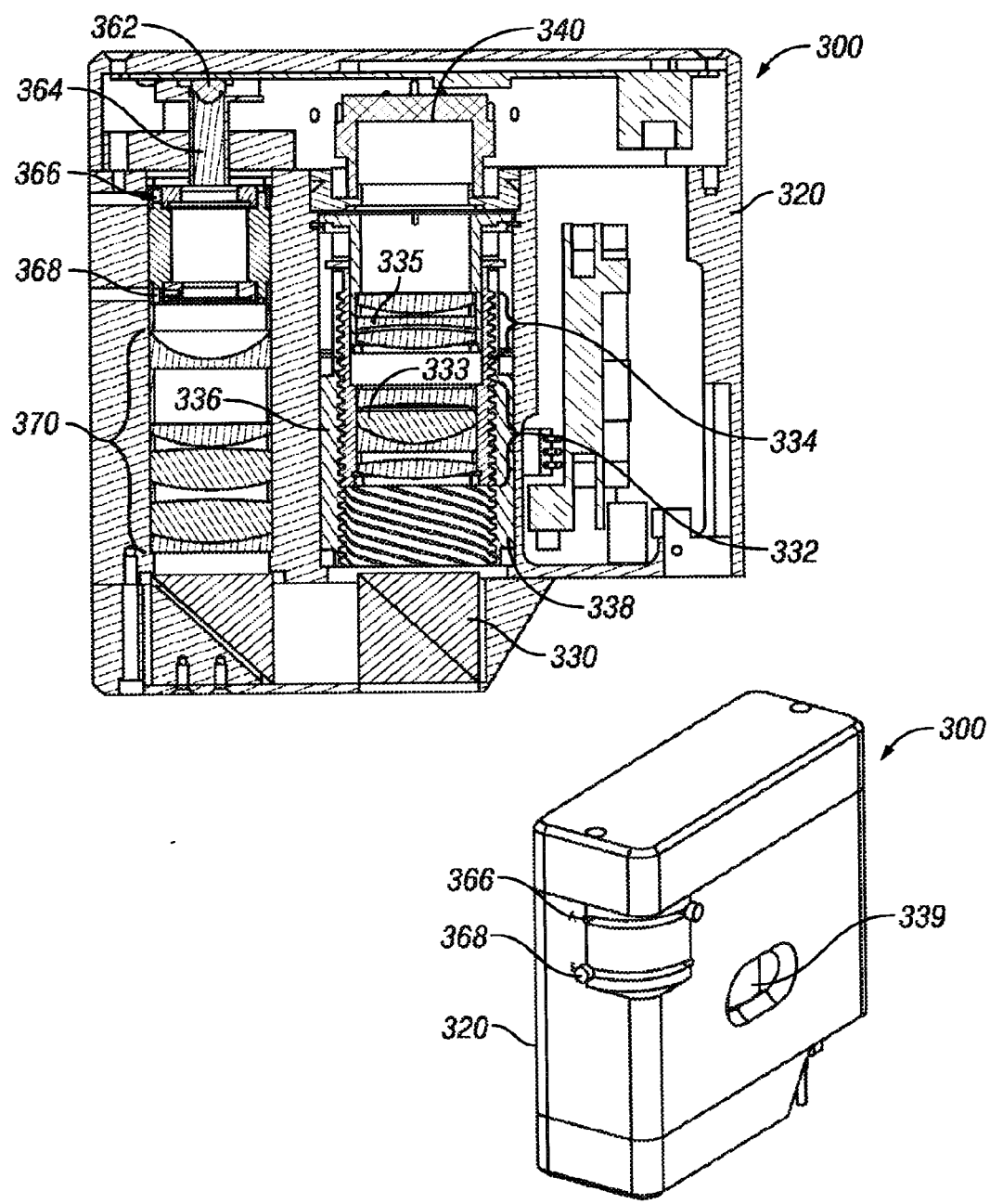
FIG. 3: A schematic of the optics used to view the probe and the sample.

The View module 300 is enclosed in its own frame 320 which is mounted on the Chassis 100 above the Head module 400. As shown in FIG. 3, the View module 300 includes an illumination arrangement, lenses and an image sensor. The View module 300 may be removed from the Head module 400 in order to provide access for maintenance and calibration or to replace one View module with another having enhanced or different capabilities.

The viewing arrangement includes an illumination arrangement for illuminating the sample through the objective lens 306. This includes a light emitting diode (LED) 362, an aperture diaphragm 366, a field diaphragm 368, lenses 370 to collimate the light from the LED and a beamsplitter 330 to direct the illumination coaxially with the optical path between the objective lens 306 and the image sensor 340. The illumination arrangement produces a substantially uniform region of illumination on the sample, approximately circular with a diameter that is set by the field diaphragm 368. Each point in the illuminated region is the apex of a cone of illumination rays. The aperture diaphragm 366 controls the cone angle of illumination. It is desirable to control the illuminated region in order to minimize stray light. It is also desirable to control the cone angle of illumination rays in order to control the depth of field and the contrast of the viewing arrangement.

Preferably the LED 362 is a high-brightness white LED with a luminous flux >65 lumens at a test condition of 350 mA and a lumen maintenance figure of >70% at a lifetime of 50,000 hours. Higher luminous flux, lumen maintenance, or luminous efficacy is desirable. Other high-brightness white or single-color LEDs may be beneficial in some applications. For example, using multiple LEDs may be desirable to supply brighter illumination and using a high-brightness red LED is desirable to enhance color contrast between red and green features on a sample.

Under some circumstances, an alternate illumination source such as a tungsten halogen lamp, an arc discharge lamp, or a metal halide lamp may be desirable for the viewing arrangement. Furthermore it may be desirable to dispose the illumination source at a significant distance from the View module 300, in which case the illumination source may be coupled into the View module 300 through means such as a flexible fiber optic bundle, a liquid light guide, an optical fiber or a rigid light guide. Removing the illumination source from the View module 300 provides advantages such as the possibility of higher illumination intensity and reduced heating of the AFM.

The viewing arrangement may be configured to provide Köhler illumination of the probe 571 or sample, by disposing the lenses of the View module 300 such that an image of the illumination source is produced at a plane near the back focal plane 350 of the objective lens 306 as shown in FIG. 3.

When a LED 362 or a group of LEDs is used as the illumination source, it may be beneficial as depicted in FIG. 4A to introduce a beam integrator 364 after the LED 362. A beam integrator compensates for the typically small emitting area of the LED and makes it easier to provide Köhler illumination for the probe 571 and sample. Preferably, the beam integrator 364 is a transparent cylinder of polymethylmethacrylate having a polished cylindrical face, a rough concave face disposed adjacent to the dome of the LED 362 and a roughened flat face disposed in the direction of the aperture diaphragm 366. Alternatively the beam integrator 364 may be made from a different optically clear polymer or from glass. Alternatively, a holographic diffuser may be used in place of a beam integrator.

The viewing arrangement includes an image sensor 340 on which is formed an image of the probe 571 or sample. Preferably the image sensor 340 is a complementary-metal-oxide-semiconductor imaging array integrated with support electronics. A good field of view and resolution can be achieved by the use of a ½" nominal image sensor (approximately 6.4 mm×4.8 mm) with 3.2 μm square pixels. Alternatively, the image sensor 340 may be another image sensor known to those skilled in the art.

Combining the viewing arrangement with the optical lever arrangement, and using the same objective lens 306 for both arrangements, as with the modular AFM of the present invention, presents a number of operational issues. First, it is common to observe some undesirable leakage of the optical lever beam 402 into the viewing arrangement, although it should be noted that this leakage can be useful in that state of the art AFMs use such leakage as a means to position the optical lever beam onto the side of the probe 571 opposite the tip.

Second, while it is desirable to separate the viewing arrangement from the optical lever arrangement by using different light wavelength bands for each, for example a visible wavelength band for the viewing arrangement and a near infrared wavelength band for the optical lever arrangement, it is nevertheless beneficial that the viewing arrangement be optically well corrected for both wavelength bands. This will enable the user of the modular AFM of the present invention to view small features on the sample, view the probe 571 (particularly small probes in connection with video rate imaging), view the position of the optical lever beam relative to the probe 571 and facilitate focusing the optical lever beam on the probe 571. The optical correction may be such that the spherical aberration, longitudinal chromatic aberration, coma, field curvature and astigmatism are below the diffraction limit over a field of view, measured at the sample, with a diameter greater than 0.8 mm. It is also beneficial to make the following additional corrections: 1) distortion in the viewing arrangement reduced to better than 1 percent over a field of view with a diameter greater than 0.8 mm measured at the sample; 2) making the lateral color within the wavelength band for the viewing arrangement lower than the diffraction limit over a field of view with a diameter greater than 0.8 mm measured at the sample; and 3) making the lateral color between the wavelength band for the viewing arrangement and the wavelength band for the optical lever arrangement less than three times the diffraction limit over a field of view with a diameter greater than 0.8 mm measured at the sample.

Third, adjusting the focus of the optical lever arrangement or the viewing arrangement typically involves moving the objective lens 306 along its optical axis and perpendicular to the sample. However, once the focus of either arrangement is optimized, the other focus may not be optimal. Since the depth of focus may be as short as 5 μm in one embodiment of the invention, and the tips of commonly used AFM probes can be as tall as 20 μm, a significant shift of focus between the plane of the probe and the plane of the sample may be necessary to image one after bringing the other into focus. This focus shift is of greatest concern when providing for small probes in connection with video-rate imaging.

These last two operational issues presented by combining the viewing arrangement with the optical lever arrangement, both arrangements using the same objective lens 306, may be addressed with a focus adjustment means. When focus adjustment means are actuated by the user, the image sensor 340 of the viewing arrangement receives a focused image from a different plane, shifted axially from the front focal plane 307 of the objective lens 306. Preferably the full range of focal shift should exceed 50 μm, measured from closest focus to most distant focus.

One embodiment of a focus adjustment means may employ multiple-element lenses. As depicted in FIG. 3, in this embodiment a seven-element lens having two groups is employed. The first, moving group 332, contains four elements and the second, stationary group 334, contains three elements. Moving group 332 moves not more than 20 mm to achieve a focal shift greater than 50 μm as discussed above and includes at least one positive element 333 made from a material having an Abbe number $v_d$ greater than 65, such as optical-quality calcium fluoride, or S-FPL53 glass from Ohara Corp. Stationary group 334 contains at least one negative element 335 made from a material having an Abbe number $v_d$ less than 30, such as N-SF11 from Schott AG.

The focus adjustment means is designed so that neither the magnification of the image received by the image sensor 340 nor the distortion of the image changes when this means is actuated.

The focus adjustment means is actuated by rotating a nut 338 with internal helical threads. This engages a barrel 336 with external helical threads and moves it axially. The barrel 336 contains the moving group 332. Other configurations are possible. For example, moving group 332 may be mounted on a cross-roller-bearing stage or ball-bearing stage which is driven by a leadscrew or ballscrew and actuated by a crank, knob, stepper motor or DC motor.

Preferably the focus adjustment means is equipped with an indicium corresponding to the setting at which the front focal plane 307 of the objective lens 306 is focused at the image sensor 340 of the viewing arrangement (the "infinity condition"). This indicium can then be used as a reference plane when adjusting the objective lens 306 to optimize the sensitivity of the optical lever arrangement or when adjusting the objective lens 306 to optimize the image of the probe 571 and/or sample. One means for providing an indicium is to equip the nut 338 with a detent (not shown) which tells the user that the system is in the infinity condition. Preferably, the nut 338 also contains a sensor capable of producing an electronic signal when the infinity condition is met, such as a magnet (not shown) on the nut 338 and a Hall sensor (not shown) on the frame 320 of the View module 300 adjacent to the magnet. This enables the operating software for the modular AFM of the present invention to indicate when the infinity condition is met. Alternatively, the indicium may include a visible mark 339, an electronic contact switch, and/or an infrared gate sensor.

Other embodiments of a focus adjustment means may be achieved with a combination of optical elements such as lenses, diffractive optics, hybrid diffractive/refractive optics, prisms, reflective optics, catadioptric optics, anamorphic optics, holographic optical elements, gradient index optics, microlenses, array optics, coherent optical fiber bundles, fused optical fiber faceplates, and/or materials with negative refractive index.

Head Module

The Head module 400 includes the optical lever arrangement providing the detection of probe deflection that is integral to an AFM. As shown in FIG. 4A, the Head module 400 is enclosed in its own frame 406 which is mounted on the Chasis 100. In order to facilitate the discussion that follows, FIG. 4A also shows the View module 300 and the probe 571 (to be clear, the probe is part of the Scanner module 500, not the Head module).

As shown on FIG. 1, the Head module 400 is attached to the Chassis 100 via a linear stage 801 allowing travel in the Z direction. Preferably the stage 801 is a precise, high-stiffness, high-resolution linear stage including three cross-roller-bearing stages with co-aligned axes, driven by a precision leadscrew and a stepper motor. An optical encoder of a type known to those versed in the art measures the Z position of the stage 801 with submicron resolution.

During operation, the stage 801 is actuated to optimize the focus of the optical lever arrangement relative to the probe 571 and in that connection to establish the infinity condition referred to above. The focus adjustment means of the View module may then be used to image the probe 571 and/or the sample (not shown). When the probe 571 is far from the surface of the sample, the stage 801 can also be actuated sequentially to focus on the probe 571 and then the sample. The Z positions of the stage 801 may then subtracted to determine the distance between the probe and the sample.

This procedure permits a desirable improvement in the speed with which the probe 571 may be engaged on the sample surface.

The focused spot must also be centered in X and Y on the top of the probe 571 opposite the tip. To this end, the Head module 400 is further attached to the Chassis 100 via a two-axis linear stage (not shown) permitting motion in X and Y. The two-axis linear stage moves all of the components of the Head module 400 together and simultaneously, namely all of the components enclosed by the frame 406 plus the components of the Light Source submodule 470. Preferably the two-axis linear stage is carried on the linear stage 801 and the Head module 400 is carried on the two-axis linear stage. Alternatively, the linear stage 801 may be carried on the two-axis linear stage, which would be attached directly to the Chassis 100.

Preferably the two-axis linear stage includes two precise, high-stiffness cross-roller-bearing linear stages, nested, with their axes disposed perpendicular to each other. Each linear stage is driven by a precision leadscrew and a stepper motor, and its position in X or Y is measured by an optical encoder with submicron precision.

In an alternative embodiment, the focused spot may be centered in X and Y using a two-axis goniometer (not shown). The goniometer and the objective lens 306 are attached to the Z stage 801, and the remaining elements of the Head module 400 are attached to the moving portion of the goniometer. The goniometer is disposed such that its center of motion lies in the back focal plane 350 of the objective lens 306. Furthermore, the center of motion is displaced from the central axis of the objective lens 306 to a point 450 (as shown in FIG. 4) that is centered on the beam 402. This ensures that the angle of the light reflected from the probe 571 does not change when the goniometer is actuated.

The components of the optical lever arrangement of the modular AFM of the present invention are arranged so that the light beam 402 incident on the probe 571 and the light beam reflected from the probe overlap and are taken through the same lens system. This avoids a complex lens system or an accumulation of lenses in close proximity to the probe 571. The two beams are separated by polarization using a beamsplitter in conjunction with a quarterwave plate. Separation of overlapping beams by these means is well known to those versed in the art.

The Light Source submodule 470 shown in FIG. 4 encapsulates in a separate housing 471 the light source 472, which emits the incident light beam 402, and a lens 473, sometimes a collimating lens, for the optical lever arrangement.

The alignment between the light source 472 and the lens 473 and between the lens 473 and the back focal plane 350 of the objective lens 306 are some of the most critical alignments in the optical lever arrangement. Since optics with millimeter scale focal lengths are often required to get the desired dimensions for the focused optical lever spot, small misalignments in the relative position of the light source 472 and the lens 473 and of the lens 473 and the back focal plane 350 of the objective lens 306 can cause large misalignments at the front focal plane 307 of the objective lens.

The housing 471 of the Light Source submodule 470 maintains a precise alignment between the light source 472 and the lens 473. Furthermore the exterior of the housing 471 of the Light Source submodule 470 has a well defined reference structure which mirrors a receiving reference structure which is an integral part of the frame 406 enclosing the Head module 400. The interface between the reference structure on the exterior of the housing 471 and the receiving reference structure 406 may be kinematic, but other, including higher-stiffness, interfaces are also appropriate. When the reference structure on the exterior of the housing 471 and the receiving reference structure 406 are properly interfaced, Light Source submodule 470 is precisely indexed to the remainder of the elements of the optical lever arrangement thus maintaining a precise alignment between the submodule and the back focal plane 350 of the objective lens 306.

The Light Source submodule 470 is designed to be easily removable and replaceable in the field, without requiring any other part of modular AFM of the present invention to be returned to the factory or a service center. This ease of removal and replacement confers many advantages. One of the most obvious is that when the light source 472 has failed or reached the end of its useful lifetime, the Light Source submodule 470 can simply be removed and replaced with a new Light Source submodule.

More importantly, users may remove and replace any Light Source submodule 470 with another having a different light source 472, a different lens 473 or a different alignment, or any two or all these things, depending on their sample, the probe size, their experimental technique and other factors. The user can select the most appropriate submodule for a particular operating session, and a different submodule for a different operating session, in order to obtain optimal performance under different conditions.

Figure 6:
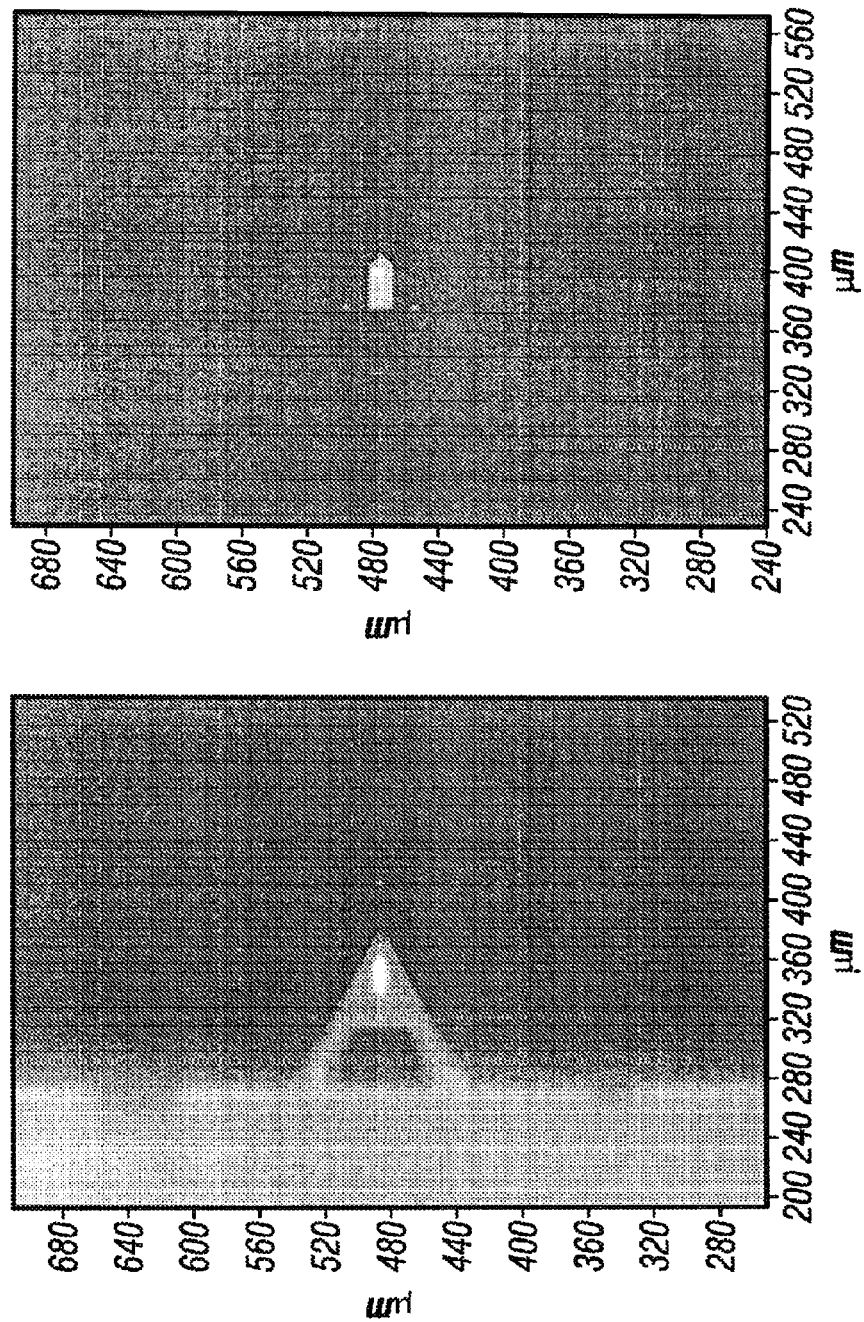
FIG. 6: Optical images of two focused emitter spots formed from two different replaceable emitter assemblies.

FIG. 6 shows the optical images of two different focused optical lever spots reflecting off two different probes 571. The different spot sizes result from the use of different Light Source submodules 470, each with a different lens 473.

The light source 472 of the Light Source submodule 470 may be one of many different sources including, but not limited to, laser diodes, superluminescent laser diodes (SLDs) or vertical cavity surface emitting lasers (VCSELs), as well as fiber coupled sources.

Figure 5:
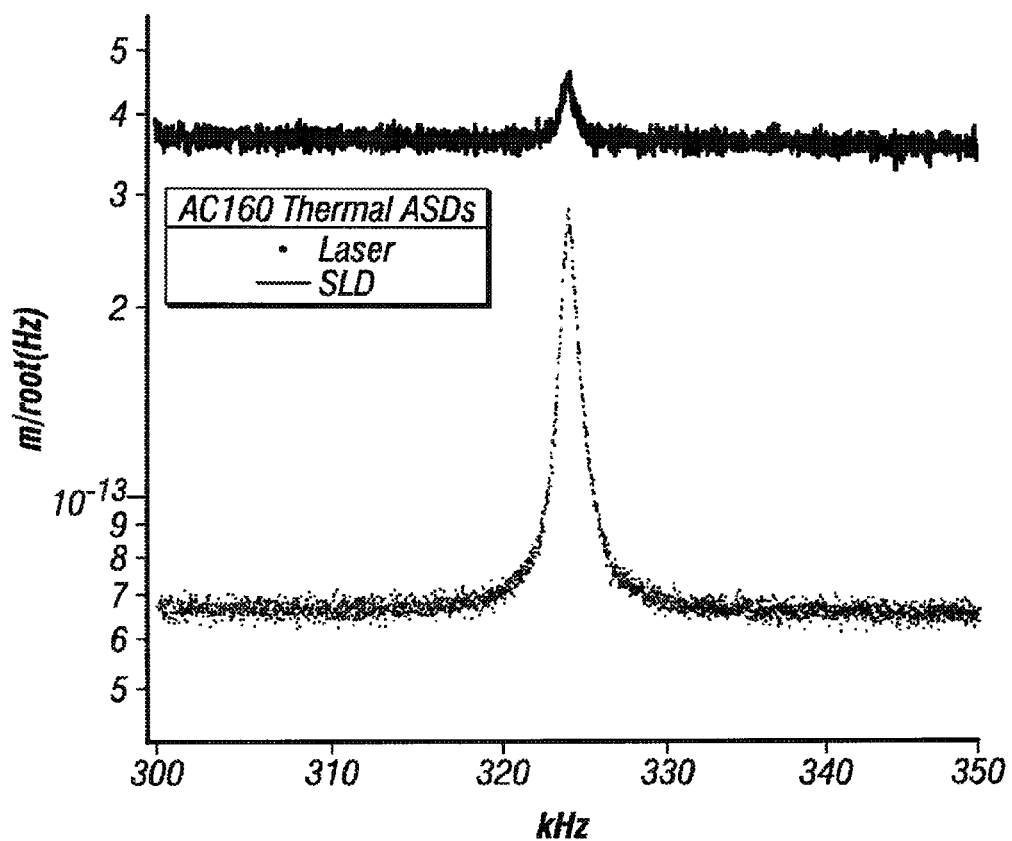
FIG. 5: Two different amplitude spectral densities of the deflection signal for a probe taken with two different replaceable emitter assemblies.

It is well known that SLDs are good light sources for doing force curves because of the short coherence length of the light they emit. However, many SLDs are inherently noisier than laser diodes when used in an optical lever arrangement. FIG. 5 shows two different amplitude spectral densities of the deflection signal for the same un-excited cantilever (Olympus AC160). Each spectral density was taken with a different optical lever arrangement: one used an SLD, while the other used a laser diode. The advantage of using the laser diode for imaging and the SLD for force curves is clear: the laser diode produces images with less noise, while the SLD gives less interference artifacts in force curves.

Preferably the light source of the Light Source submodule 470 should have a small emitting area, on the order of 30 μm and a beam propagation factor $M^2$ less than 3. The beam 402 is preferably a beam with a desired beam waist location and rate of convergence or divergence. The lens 473 is preferably an aspheric lens, but may be one of many different types of optics including, but not limited to, spherical lenses, graded index lenses, diffractive optical elements, reflective optical elements, hybrid optical elements and groups of optical elements. The distance between the light source 472 and the lens 473 may be adjusted precisely to produce a collimated beam 402 or the desired rate of convergence or divergence.

As previously discussed, some users may find video rate imaging advantageous. In this situation the user will use small probes and therefore will need the AFM to create a small optical lever spot. For this purpose the user can use a submodule 470 with a lens 473 having a different effective focal length, producing an appropriately small focused optical lever spot at the front focal plane 307 of the objective lens 306. Moreover, again as previously discussed, optimal optical lever detection requires that the spot from the light beam substantially fill the top surface of the probe opposite the tip in one dimension. Here, too, the user can select a submodule 470 with a lens 473 that produces an optimal focused optical lever spot size and thereby maximize detection sensitivity.

Prior art has put an aperture in the path of the incident light beam 402 just after the Light Source submodule 470 and before the polarizing beamsplitter 401 to control the size of the focused optical lever spot at the front focal plane 307 of the objective lens 306. This approach has the important disadvantage of blocking some of the light from the Light Source submodule 470, thereby increasing shot noise. Prior art has also used a beam expander or changed the objective lens 306 to control the size of the focused optical lever spot. Both such approaches add unnecessary complications relative to the design of the modular AFM of the present invention. Beam expanders add undesirable size to the optical lever arrangement and switching the objective lens 306 unnecessarily forces the user to change the resolution and field of view of the optical viewing arrangement.

In one preferred embodiment the light source 472 is connected to means for controlling the coherence length of the emitted light. A shorter coherence length is desirable to reduce the occurrence of artifacts in the optical lever arrangement, for example sinusoidal background signals due to optical interference.

Figure 4B:
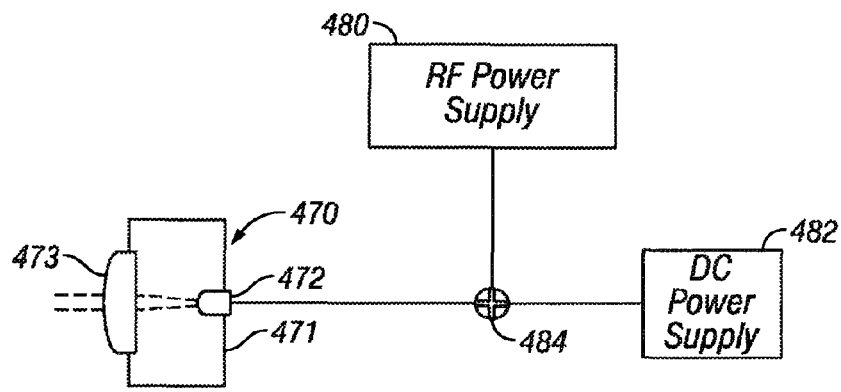
FIG. 4B: A schematic of an embodiment for controlling the coherence length of the light emitted by the emitter.

When the light source 472 is a laser diode, the coherence length can be made shorter by the apparatus shown as a block diagram in FIG. 4B. A current is supplied to the light source 472 by a substantially direct current power supply 482. A radio frequency power supply 480 generates an RF signal, which is combined with the DC current by the combining element 484, which may be a bias tee, a summing amplifier, a summing junction, a series connection, or a parallel connection.

The power supply 482 may contain a circuit (not shown) to stabilize the power of the light emitted from light source 472. This circuit may adjust the current to the light source 472 based on the power detected by a photodiode (not shown) mounted directly behind the light source 472. Alternatively, the power stabilization circuit may adjust the current based on the total light detected by the photodetector 404, or based on the light detected by a photodiode (not shown) placed elsewhere in the Head module 400.

In another preferred embodiment the Light Source submodule 470 includes an optoisolator (not shown) that is adjusted to transmit light from the light source 472 toward the polarizing beam splitter 401 and, at the same time, not to transmit light that is propagating back toward the light source 472. This device minimizes the effects of light reflected from other optics in the Head module 400 back to the Light Source submodule 470. Back-reflected light can cause undesirable fluctuations in the output of the light source 472. It is however preferable to minimize back-reflected light by the design of the optics in the Head module 400, including the use of appropriate antireflection coatings.

In another preferred embodiment the light source 472 is connected to means for stabilizing the temperature of the source. Temperature stabilization may have the benefit of producing a more constant wavelength, noise level, or power level of the light in the beam 402. It also enables the selection of operating conditions that favor a longer lifetime for the light source 472. One temperature stabilization means (not shown) includes a Peltier heating/cooling element to allow the temperature of the light source 472 to be adjusted, a temperature sensor disposed close to the emitting junction of the source 472 and a feedback circuit that adjusts the output of Peltier element appropriately.

Figure 4C:
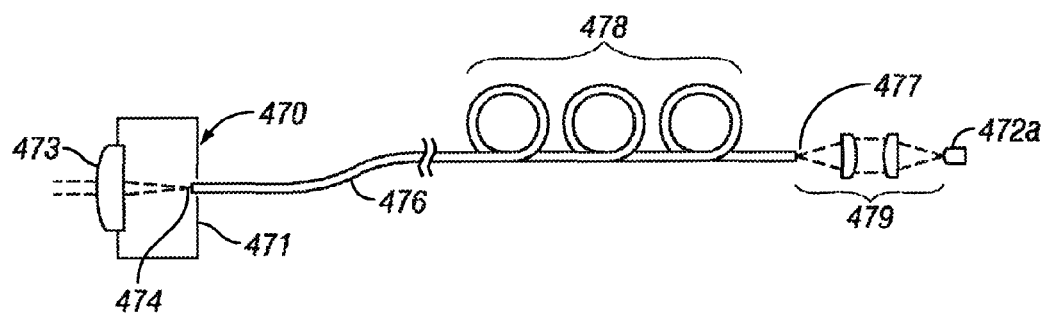
FIG. 4C: A schematic of an embodiment for locating the emitter remotely from optics used to form a focused emitter spot.

In another preferred embodiment the Light Source submodule 470 is reconfigured so that the light source is located remotely from the submodule. As shown in FIG. 4C, in this embodiment light is emitted by light source 472a and coupled into the distal face 477 of fiber optic element 476 by focusing the light through coupling optics 479. Alternatively, the light source 472a may be abutted or fused directly to the distal face 477. The light is then transmitted from the distal face 477 through fiber optic element 476 and re-emitted at its proximal face 474, and from there disposed within the Light Source submodule 470 similarly to the disposition of light emitted by light source 472. In particular, the proximal face 474 is disposed relative to the lens 473 so as to produce a substantially collimated beam 402 or a beam with the desired rate of convergence or divergence.

The embodiment of FIG. 4C confers multiple advantages. It permits the use of another light source 472a that would otherwise be too bulky or act as an undesirable source of heat, acoustical noise, or electrical noise if that source were mounted near the Head module 400. For example, the remote location permits the use of a fiber laser or a diode-pumped solid state laser as the light source 472a and minimizes the negative effects of such lasers.

An important source of noise in a conventional optical lever arrangement is fluctuations in the angle and/or position of the light emitted from the light source. In the embodiment of FIG. 4C, however, light from source 472a is passed through fiber optic element 476, which can reduce the fluctuations in the angle and/or position of the light. Preferably, fiber optic element 476 transmits only light of a single mode at the emission wavelength of the source 472a. This is desirable in order to minimize the beam propagation parameter $M^2$ of the beam 402 emitted by the Light Source submodule 470. It is also desirable because a fiber optic element operating in the single-mode regime only transmits the intensity of the light and does not transmit any fluctuations in the angle or position of the light. Therefore the light emitted from proximal face 474 of fiber optic element 476 has reduced fluctuations, and the Light Source submodule 470 produces a beam 402 with lower noise.

Light can be transmitted in undesirable cladding modes in a fiber optic element such as fiber optic element 476. Unless they are suppressed, the cladding modes defeat the benefits of single mode operation described above by transmitting angle and/or position fluctuations and increasing $M^2$. In a non-preferred embodiment, a substantial length of fiber optic material is used for fiber optic element 476, such that the total length of fiber optic element 476 is many times greater than the decay length of any cladding modes present in the design of the fiber optic material. This embodiment is relatively undesirable because the length of fiber optic element 476 may have to be tens of meters to suppress the cladding modes.

Preferably, the cladding modes are suppressed by a mode suppression element 478 which includes a series of loops in the fiber optic element 476, as shown in FIG. 4C. The radius of the loops is chosen to be small enough to cause rapid attenuation of the cladding modes, yet large enough that the attenuation of the single mode is acceptably low. Alternatively, the fiber optic material may be bent in a sine wave pattern with a minimum radius in accordance with the criteria just discussed. Another means of suppressing the cladding modes includes a segment (not shown) of fiber optic material where the jacket of the material is removed and the cladding is immersed in an index-matching liquid such as glycerin or immersion oil.

In addition to being single mode, the fiber optic element 476 may be a step-index fiber, gradient index fiber, silica fiber, chalcogenide fiber, fluoride glass fiber, or photonic crystal fiber. Preferably, fiber optic material 476 is of a polarization-maintaining design, such that the correct polarization state can be produced in beam 402 for input into beamsplitter 401. Alternatively, the fiber optic material 476 can be of a non-polarization-maintaining design. In this case, however, additional polarization-changing optics (not shown) are introduced after lens 473 to provide the correct polarization state in beam 402. Optionally, the polarization-changing optics may include a waveplate to rotate the polarization of the beam or a polarization scrambler and a polarizer.

The other important elements of the optical lever arrangement of the modular AFM of the present invention are depicted in FIG. 4. The incident beam 402 formed by the Light Source submodule 470 is directed to a polarizing beamsplitter 401 that passes only one polarization direction of the incident beam 402. The other polarization direction is reflected in a direction opposite to that of the photodetector 404, where it hits a black body 426 that minimizes stray light. The portion of the incident beam 402 that passes through the polarizing beamsplitter 401 is then transmitted through a quarterwave plate 403, where it becomes elliptically polarized. From there the polarized incident beam 402 is directed toward the objective lens 306 by a dichroic shortpass mirror 405, which combines the beam with the beam 309 of the viewing arrangement. Light from the polarized incident beam 402 that is not reflected from the dichroic shortpass mirror 405, as well as light from the beam 309 of the viewing arrangement that is undesirably reflected is absorbed by a second black body 420. The combined beams 402 and 309 pass through the objective lens 306 and reflect from the top surface of the probe 571. The reflected beams pass back through the objective lens 306 to the dichroic shortpass mirror 405, which separates the two beams, transmitting the viewing arrangement beam 309 while reflecting the optical lever arrangement beam 402. The optical lever arrangement beam 402 passes back through the quarterwave plate 403 where it is linearly polarized and is directed by the polarizing beamsplitter 401 to the position-sensitive photodetector 404. The linear polarization imparted to the reflected optical lever arrangement beam 402 by the quarterwave plate 403 is substantially perpendicular to the elliptical polarization that was imparted to the incident beam 402 when originally passed through the quarterwave plate 403. As a result of this perpendicular polarization, the beam reflected by the probe 571 is almost completely transmitted onto the detector 404. Such differential polarization, using a beamsplitter and quarterwave plate is well-known as is the required orientation of the components.

A filter 422 may be interposed between the beamsplitter 401 and the photodetector 404 in order to substantially transmit light of the wavelength of the beam 402 and absorb or reflect light of other wavelengths, including ambient light and scattered light from the viewing arrangement. The filter 422 is desirable to reduce noise and drift in the detector 404.

Preferably, the beam 402 of the optical lever arrangement is an infrared beam, and the beam 309 of the viewing arrangement is a visible light beam. However, in some embodiments it may be desirable to use other wavelengths. For example, it may be desirable to use a short wavelength for the beam 402 of the optical lever arrangement in order to achieve a smaller focused spot. In this case, the beam 402 may be ultraviolet and the beam 309 of the viewing arrangement may be visible light. Such a combination of wavelengths of the two beams makes it desirable that a dichroic longpass mirror be substituted for the dichroic shortpass mirror 405.

The dichroic shortpass mirror 405 may introduce an undesirable phase shift between S- and P-polarized light in the beam 402 of the optical lever. This causes some of the beam, after reflecting from the probe 571 and returning to the quarterwave plate 403, not to be reflected by the beamsplitter 401 toward the detector 404 but rather to be transmitted toward the Light Source submodule 470. Preferably, this is minimized by the use of a custom coating design for the dichroic shortpass mirror 405 that has equal phase shifts for S- and P-polarized components of light. Alternatively, the quarterwave plate 403 can be replaced by a waveplate with a retardance greater or less than a quarter of a wavelength. The retardance introduced by this replacement taken together with a change in the angle of rotation around its axis may be made to compensate completely for the phase shift introduced by the dichroic shortpass mirror 405, yielding substantially complete reflection of the beam 402 by the beamsplitter 401. For example, with a phase shift of −20°, a waveplate with a retardance of 0.268 wavelengths and a rotation angle of 125.6 degrees about its axis will produce substantially complete reflection toward the detector 404, with very little light transmitted toward the Light Source submodule 470.

Alternatively, the problem of a phase shift between S- and P-polarized light introduced by the dichroic shortpass mirror 405 can be solved by eliminating the quarterwave waveplate 403, and instead disposing a waveplate (not shown) with a retardance of approximately a quarter of a wavelength between the dichroic shortpass mirror 405 and the objective lens 306. With these changes the phase shift does not arise because the light reflected from the top surface of the probe 571 to the dichroic shortpass mirror 405 is entirely S-polarized or P-polarized. In this configuration, however, the waveplate 403 should be coated with a dual-waveband antireflection coating. This coating is necessary to avoid undesirable back-reflections of the viewing arrangement beam 309 which would result in reduced contrast in the image delivered to the image sensor 340.

Other configurations of polarization-sensitive elements are possible. For example, the waveplate 403 is preferably a zero-order quartz waveplate, but may be replaced by a multiple-order quartz waveplate, a polymer waveplate, a mica waveplate, an achromatic retarder, a crystal retarder, achromatic retarder, Fresnel rhomb, or other element affording controlled retardance of polarization. Similarly the polarizing beamsplitter 401 is preferably a polarizing beamsplitter cube, but it may be replaced by a calcite polarizer, a Glan-Thompson polarizing beamsplitter, a Wollaston prism, a Rochon prism, or similar optical element.

As shown in FIG. 4A the incident beam 402 passes through the objective lens 306 away from the central axis of the lens at a sufficient distance so that the beam emerges from the objective lens 306 tilted 11° from the vertical. However the probe 571 is mounted 11° from the horizontal so the incident beam 402 (and the reflecting beam) is normal to the plane of the top surface of the probe 571 opposite the tip. This has several advantages. For example, light lost by shadowing on the edge of the probe is minimized. This is especially important for the high numerical aperture systems that are necessary for the small probes enabling video rate imaging, because a cone of light with a large opening angle must reach the probe.

The prior art disposes an objective lens for optical lever detection perpendicular to the probe, but at a significant angle to the sample. As a result the view of the sample at any time is limited to a narrow strip, and sequential repositioning of the objective lens is required to locate optical features on the sample (e.g. reference marks to indicate a location for AFM scanning). In contrast, the objective lens 306 of the modular AFM of the present invention is disposed with its optical axis substantially perpendicular to the surface of the sample. This disposition of the objective lens, taken together with the focus adjustment means of the View module 300, permits a large region of the sample to be viewed with a flat field and high optical resolution. This improvement speeds the viewing and location of optical features on the sample.

A further advantage of the present invention over the prior art is that the objective lens 306 may be an unmodified commercial objective lens. Such a commercial lens offers higher performance at a lower cost per unit than custom-designed lenses. The objective lens 306 is also readily accessible to the user and can be replaced or upgraded with different objective lenses for different functions without alignment or special tools. For AFM imaging in liquid, the user may select an objective lens with a spherical aberration correction collar. The correction collar can be adjusted for high resolution imaging in fluids of varying depth and varying refractive index. For AFM imaging in air, the user may choose an extra-long-working-distance objective lens that has no correction collar. The extra-long-working-distance objective provides more access to the sample, facilitating electrical connections to the sample and other applications benefiting from additional space.

Scanner Module

Figure 7:
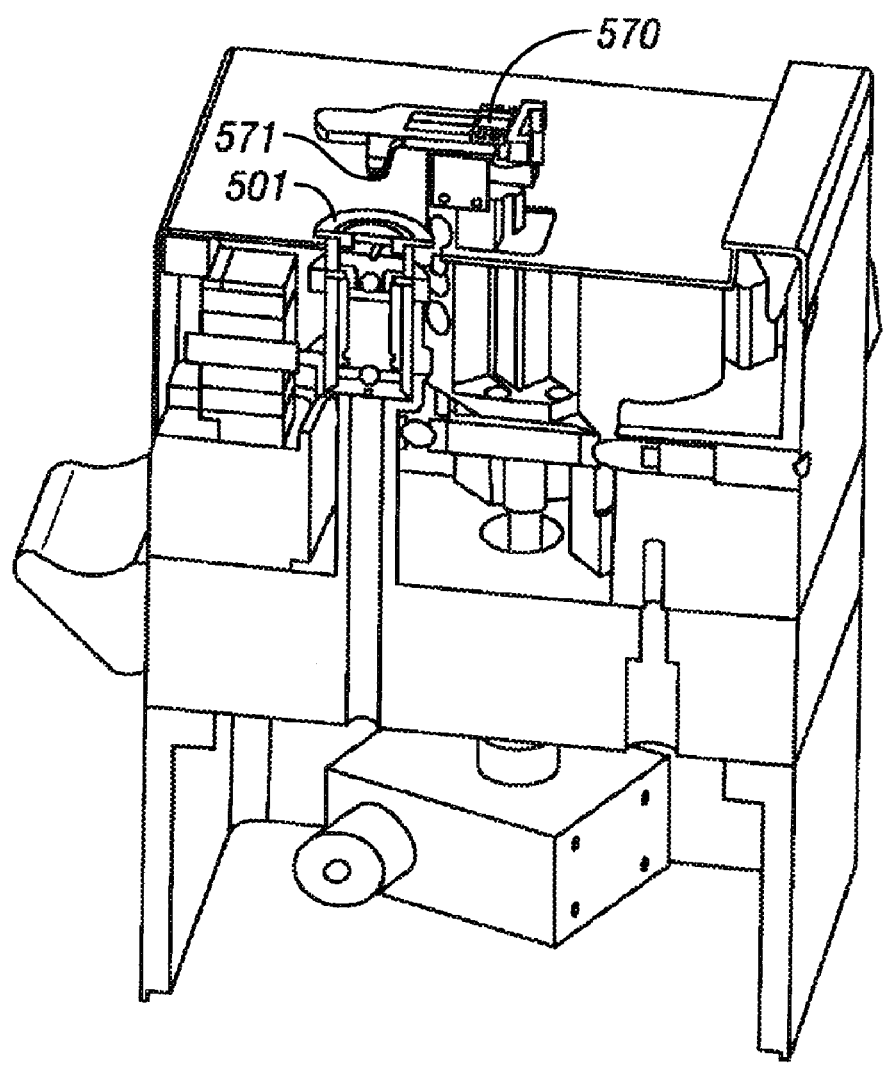
FIG. 7: Photograph and physical model cross section of a particular implementation of the preferred embodiment of the scanner.

The Scanner module 500, which includes the XYZ translation stage 501 that actuates the sample in those axes, is depicted in FIG. 7. This stage utilizes three piezoelectric activated flexures arranged in a tripod configuration to provide movement in the X and Y axes to scan (e.g. raster) the sample relative to the tip of the probe 571 and movement in the Z axis for returning the system to a reference state in response to the deflection or oscillation of the probe 571 relative to the sample. Position sensors may be used to provide precise positional information about the movement of the piezoelectric activated flexures which may be used to correct the movement to that intended. A LVDT which may be used for this purpose is described in a co-pending application, U.S. patent application Ser. No. 12/587,947, Integrated Micro-Actuator and Linear Variable Differential Transformer for High Precision Position Measurements, by some of the same inventors.

As depicted in FIG. 1, the Scanner module 500 also includes the Cantilever Holder submodule 570 which holds the probe 571 and forms part of the engage mechanism of the modular AFM that is the present invention. The Cantilever Holder submodule 570 is attached to the Scanner module 500 with a one-axis linear stage 802 which permits vertical movement in the Z axis in connection with the engage mechanism. This movement may be provided with a motor (not shown) chosen for this purpose and known to those skilled in the art. Preferably the linear stage 802 incorporates a high-stiffness, low friction bearing such as a crossed-roller bearing.

The Scanner module 500 may be slid in and out of the Chassis 100 to allow a sample 706 to be mounted on the XYZ translation stage 501 and/or a probe 571 to be mounted on the Cantilever Holder submodule 570. The Scanner module 500 may then be slid back into the Chassis 100, where it is locked in position, and properties of the sample imaged or measured.

The Scanner module 500 may be totally removable from the Chassis 100 for replacement or upgrading with another scanner module. The ability to replace the Scanner module 500 with another scanner module with different properties is advantageous because different scan sizes, scan speeds, sample environments and applications may require scanner modules with different properties. For example, a scanner module able to take advantage of small probes enabling video rate imaging will have a generally smaller scan size that will perform well only with smaller samples. The ability to upgrade the Scanner module 500 is advantageous because as more advanced components become available, such as more sensitive position sensors, the scanner can be replaced instead of making the entire AFM obsolete.

Figure 8B:
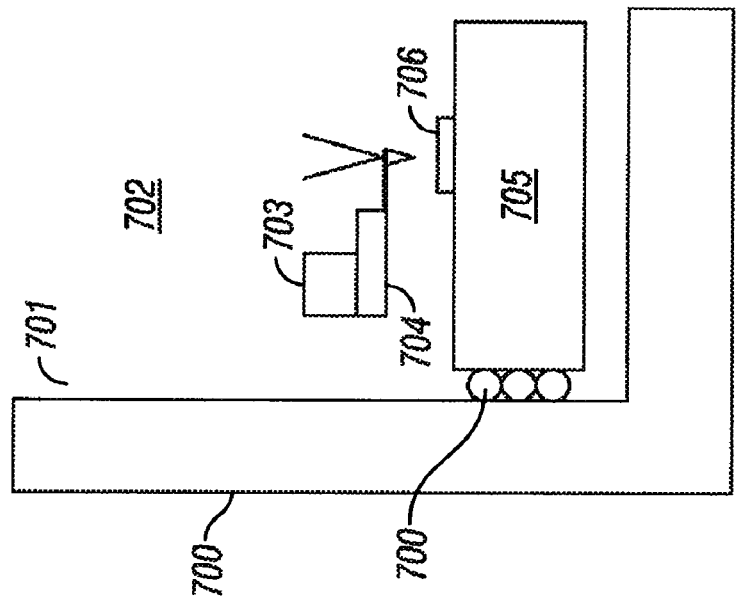
FIG. 8B: Prior art showing another conventional mechanical relationship between the optics used to form a focused emitter spot on the probe and the probe.
Figure 8A:
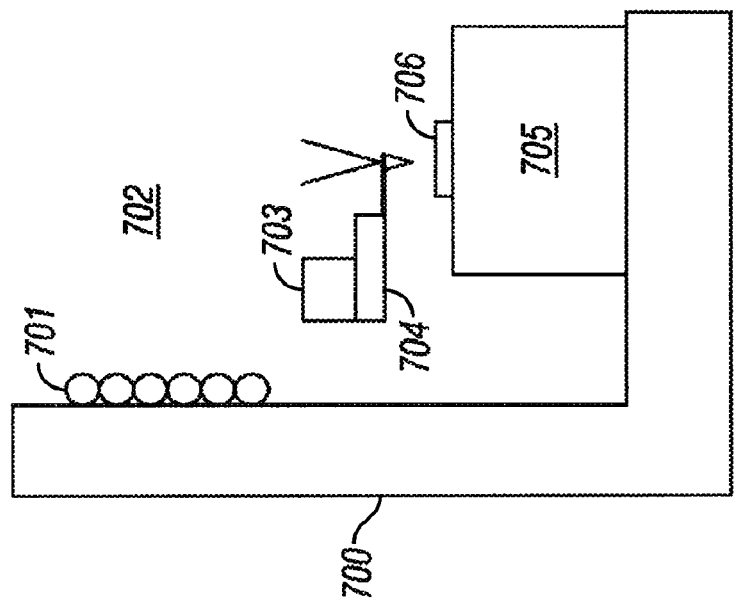
FIG. 8A: Prior art showing a conventional mechanical relationship between the optics used to form a focused emitter spot on the probe and the probe.

The engage mechanism of the modular AFM that is the present invention differs from the engage mechanisms of prior art AFMs. FIGS. 8A and 8B depict two variations of prior art engage mechanisms. In both figures a probe 704 is attached via the cantilever holder 703 to the optical lever arrangement 702. In FIG. 8A the optical lever arrangement 702 is attached to the AFM chassis 700 with a one-axis linear stage 701 which permits vertical movement in the Z axis relative to the scanner 705 on which the sample 706 is mounted. The scanner 705 on which the sample 706 is mounted is attached directly to the chassis 700 and is not movable in the Z axis. In FIG. 8B the optical lever arrangement 702 is attached directly to the chassis 700 and is not movable in the Z axis. The scanner 705 on which the sample 706 is mounted is movable in the Z axis, being attached to the AFM chassis 700 with a one-axis linear stage 701 which permits vertical movement in the Z axis relative to the optical lever arrangement 702.

The engage process in FIG. 8A consists in moving the conjoined optical lever arrangement 702, cantilever holder 703 and probe 704 vertically downward to the point where the probe 704 engages the sample 706. This is the engage process employed by many older AFMs, including the Digital Instruments MultiMode. The engage process in FIG. 8B consists in moving the scanner 705 on which the sample 706 is mounted vertically upward to the point where the probe 704 engages the sample 706.

Figure 9:
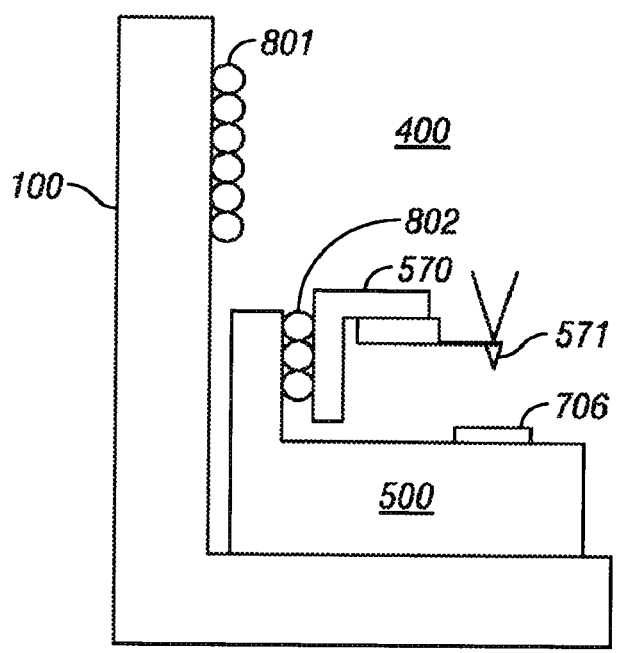
FIG. 9: The preferred embodiment of the mechanical relationship between the optics used to form a focused emitter spot on the probe and the probe.

FIG. 9 depicts the engage mechanism of the modular AFM that is the present invention. As shown, the Head module 400 is attached to the Chassis 100 with a one-axis linear stage 801, an arrangement which permits movement in the Z axis allowing the optical lever spot to be focused as desired on the back of the probe 571. As previously noted the Head module is also attached to the Chassis 100 with a two-axis linear stage (not shown), which permits movement in the X and Y axes. However, this two-axis linear stage need not be discussed in connection the current discussion of the engage mechanism. The probe 571 is held by the Cantilever Holder submodule 570 which is attached to the Scanner module 500 with one-axis cross-roller bearings 802 which permit movement in the Z axis relative to the sample 706 which is mounted on the Scanner module 500 below the probe 571. The Scanner module 500 in turn is attached directly to the chassis 100.

The engage process for the modular AFM of the present invention consists in moving both the optical lever arrangement 400 and the probe 571 (which as previously discussed moves in tandem with the Cantilever Holder module 570 holding the probe 571) identical distances vertically downward to the point where the probe 571 engages the sample 706. As a consequence, the distance between the optical lever arrangement 400 and the probe 571 remains constant and the optical lever spot remains focused as desired on the back of the probe 571.

It will be noted that the engage process for the modular AFM of the present invention is considerably more complicated than the engage processes of prior art AFMs. In the prior art, the user needed to move either the optical lever arrangement or the scanner until the probe engages the sample. In the preferred embodiment, it is necessary to move both the optical lever arrangement 400 and the probe 571 identical distances, keeping the distance between them constant, until the probe 571 engages the sample 706. The disadvantages of complexity, however, are more than compensated by the advantages conferred by the engage mechanism of the modular AFM in lowering the noise coupled into the images produced by the modular AFM. All AFMs depend on the probe accurately tracking the structure or other properties of the sample. If the probe and sample move relative to each other when they are excited by an external source of acoustic or vibrational noise, the unwanted motion is directly superimposed on the signal tracking the sample, acting as interfering noise to disrupt or degrade the measurement of the true sample structure or other properties.

To understand the effect of vibrational noise on an AFM, it is helpful to apply a simple harmonic oscillator model to the structural elements in the path between the probe and the sample (which for simplicity we refer to as the engage mechanism). Under the assumptions of this model, the change in the distance separating the probe and the sample divided by the amplitude of the external vibrational noise is proportional to the mass of the engage mechanism, divided by the stiffness of the engage mechanism:

$$\Delta x/A \alpha M/k$$

where x is the distance separating the probe and the sample, A is amplitude of the vibration noise, M is the mass of the engage mechanism and k is the stiffness of the engage mechanism[1].

[1] Since the square root of the inverse of the M/k term is the resonance of the engage mechanism, the foregoing relationship may also be considered to be a proportional relationship between $\Delta x/A$ and the inverse of the square of the resonance of the engage mechanism:

$$\Delta x/A \alpha 1/\omega_0^2$$

where $\omega_0$ is the resonant frequency of the engage mechanism.

As will be noted from FIG. 8A and FIG. 8B, the engage mechanism of the prior art includes the cantilever holder 703, the optical lever arrangement 702 and the scanner 705 in the mechanical path from the probe through the sample. In contrast the engage mechanism of the preferred embodiment includes only the Cantilever Holder module 570 and the Scanner module 500 in the mechanical path. Since the mass of a typical objective lens in an optical lever arrangement is nearly 200 grams by itself and the entire arrangement anywhere between 500 and 1000 grams, the mass of the engage mechanism of the preferred embodiment is substantially lower than that of the engage mechanism of prior art AFMs. Accordingly, since the M/k term for the engage mechanism of the preferred embodiment is much smaller than this factor for the engage mechanism of the prior art, we can expect as much as a 50× reduction in the x/A term for the preferred embodiment and therefore in the vibrational noise coupling into the image data.

The M/k term may also be reduced by fabricating the components in the mechanical path from the probe through the sample from materials with a high stiffness, or more precisely a high elastic modulus. However changes in material properties are generally insufficient by themselves. In order to gain large increases to the resonant frequency the masses of the structures involved must be reduced.

Figure 10:
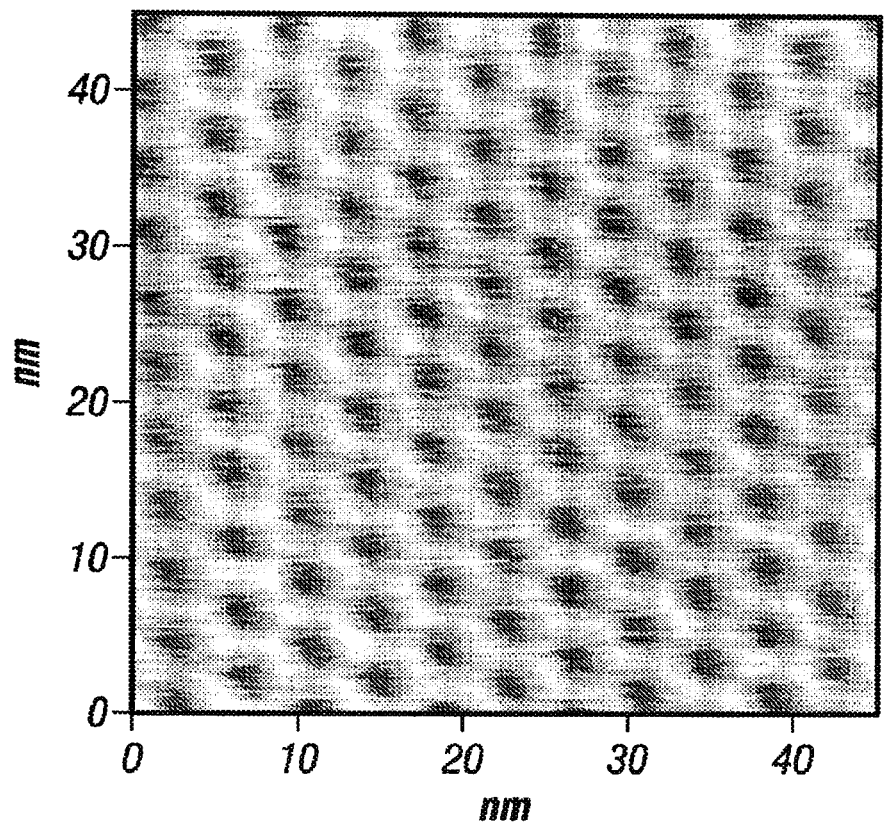
FIG. 10: Unfiltered/unprocessed STM height image of graphite was taken with the preferred embodiment.

FIG. 10 shows an unfiltered/unprocessed STM height image of graphite taken with a version of the modular AFM of the present invention modified to function as a STM. For this purpose a STM tip holder is substituted for the Cantilever Holder submodule 570 and STM electronics are substituted for the AFM electronics of the preferred embodiment. The image was taken without the use of customary vibration isolation equipment on a support structure with an integrated acceleration of 1 mm/s$^2$. The absence of periodic acoustic or vibration noise in the image is a result of the preferred embodiment.

Electronics Module

In addition to the novel engage mechanism of the modular AFM of the present invention, many other techniques are used to minimize the noise coupled into image data. One important example is locating the controller board 150 and other electronics near the AFM but on the outside of the Isolation module 200, as shown in FIG. 1.

An electrical connector 310 allows connection to electronics inside the Isolation module 200, e.g., the piezoelectric driving units and movement sensing parts such as LVDTs.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. An atomic force microscope system operating to characterize a sample, comprising:
    an atomic force microscope cantilever;
    a view system that has optical features, including an objective lens located below the view system in the head system, which allow optical viewing in an area of the cantilever or of the sample;
    a head system that directs the optical beam onto the cantilever and obtains a return beam from the cantilever indicative of movement of the cantilever, said system including said objective lens which directs the optical beam to the back of the cantilever opposite the tip and a mechanism for translating the head system in the Z direction relative to the cantilever thereby enabling the optical beam to be brought into focus on the back of the cantilever;
    a scanner system that includes a holder for the cantilever, a holder for the sample which is mounted below the cantilever, a mechanism for scanning the sample in the X, Y and Z dimensions and a mechanism for translating the cantilever in the Z direction relative to the sample, said mechanism for translating the cantilever permitting the cantilever to move in tandem with the head system vertically downward in identical distances to the point where the tip of the cantilever engages the sample; and
    a mechanical path between the cantilever and the sample which includes only the scanner system and its subsystems, the cantilever holder and the sample holder, so that the noise coupled into images and measurements of the sample is minimized.

2. The system as in claim 1, wherein said head system is replaceable as a whole to replace with a different head having different characteristics.

3. The system as in claim 1 further comprising an isolation system, that encloses a chassis that holds said mechanical path, and provides acoustic and active thermal isolation for the atomic force microscope system.

* * * * *